United States Patent [19]
Christiaens

[11] Patent Number: 4,764,697
[45] Date of Patent: Aug. 16, 1988

[54] FLAT HYBRID STEPPER OR SYNCHRONOUS MOTOR

[75] Inventor: Alois E. Christiaens, Liedekerke, Belgium

[73] Assignee: U.S. Philips Corporation, New York, N.Y.

[21] Appl. No.: 910,815

[22] Filed: Sep. 23, 1986

Related U.S. Application Data

[63] Continuation of Ser. No. 816,971, Dec. 30, 1985, abandoned, which is a continuation of Ser. No. 672,021, Nov. 16, 1984, abandoned.

[30] Foreign Application Priority Data

Aug. 20, 1984 [NL] Netherlands ............................ 8402543

[51] Int. Cl.$^4$ .............................................. H02K 37/14
[52] U.S. Cl. .................... 310/49 R; 310/112; 310/114
[58] Field of Search .................. 310/49, 156, 162–165, 310/112, 114, 126

[56] References Cited

U.S. PATENT DOCUMENTS

| | | | |
|---|---|---|---|
| 4,127,802 | 11/1978 | Johnson | 310/114 X |
| 4,206,374 | 6/1980 | Goddijn | 310/49 |
| 4,264,833 | 4/1981 | Stenudd | 310/114 X |
| 4,327,299 | 4/1982 | Goddijn | 310/112 X |
| 4,330,724 | 5/1982 | Goddijn | 310/112 X |
| 4,503,368 | 3/1985 | Sakamoto | 310/49 |
| 4,528,473 | 7/1985 | Tezuka | 310/49 X |

Primary Examiner—Patrick R. Salce
Assistant Examiner—Judson H. Jones
Attorney, Agent, or Firm—David R. Treacy; Brian J. Wieghaus

[57] ABSTRACT

Two stator sections are each provided with an annular coil which cooperates with sets of teeth to be magnetized oppositely by the coils. The teeth are arranged in sectors on each section in such a way that the sectors of teeth of one set of teeth lie between those of the other set of teeth. The rotor comprises two rotor sections each having one circularly arranged set of teeth which cooperates with the two sets of teeth of the associated stator section. The two rotor sections are axially spaced by an axially magnetized permanent magnet.

8 Claims, 5 Drawing Sheets

FLAT HYBRID STEPPER OR SYNCHRONOUS MOTOR

This is a continuation of application Ser. No. 816,971, filed Dec. 30, 1985, now abandoned which was a continuation of Ser. No. 672,021, filed Nov. 16, 1984, now abandoned.

BACKGROUND OF THE INVENTION

The invention relates to a synchronous or stepping motor comprising a stator and a rotor; and more particularly to the type in which the rotor comprises two coaxial rotor sections each having rotor teeth arranged along a circle at the outer rotor circumference and axially spaced by an interposed axially magnetized permanent magnet. The stator comprises two coaxial stator sections interconnected in a magnetically conductive fashion and each provided with at least one coaxial annular coil enclosed by a magnetically conductive circuit. Such a circuit comprises a rotor section and the stator section which surrounds the relevant annular coil, each stator section terminating in two sets of coaxially arranged stator teeth which cooperate with the rotor teeth via air gaps. One of the sets of stator teeth is oriented towards the cooperating rotor teeth and the other sets of stator teeth are offset from the cooperating rotor teeth by substantially $\frac{1}{4}$, $\frac{1}{2}$ and $\frac{3}{4}$ tooth pitch, in such a way that a difference in offset of $\frac{1}{2}$ tooth pitch is obtained between the stator sections. This type of motor is known as a "hybrid motor" and may be constructed as a stepping motor.

Such a motor is disclosed inter alia in U.S. Pat. No. 4,206,374. The stator sections of this motor comprise discs which are disposed on each side of the annular coils and which have teeth which project radially inwards and which are arranged along a circle. The stator teeth each cooperate individually with a rotor disc which has teeth which project radially outwards and are arranged along a circle in order to obtain a stepping angle of 1/200 of a revolution, that is, $0.01\pi$ radian or 1.8°, which is smaller than that of motors with offset interdigitating claw teeth.

SUMMARY OF THE INVENTION

The known motor has an axial height which is too large for some uses. The invention aims at modifying the known motor in such a way that the axial height can be reduced substantially.

In accordance with the invention each rotor section has only one set of circularly arranged teeth, and each set of stator teeth is arranged in at least two sectors which alternatively comprise teeth and do not comprise teeth. The sectors for each stator section are so positioned relative to each other that the sectors of teeth for the first and second sets of a given stator section are alternately arranged about a rotor section. Thus the sectors of one set are interposed between the sectors of teeth of the other set of the same stator section, the teeth being so arranged that for each stator section the teeth of both sets cooperate with the same set of teeth of the associated rotor section.

The invention enables the axial height of each stator section to be reduced, because no allowance has to be made for a large axial spacing of the stator teeth. In the inventive motor a sufficiently large circumferential spacing between the sets of teeth is easily created, since only one toothed disc for each rotor section has been provided. There is enough space for the rotor magnet because there is only one toothed rotor disc for each rotor section, allowing the magnetically conducting part between the two stator sections in the known motor to be dispensed with.

An easily manufactured embodiment of the invention may be characterized further in that the stator comprises four substantially identical parts of a magnetically conductive material, which parts are substantially disc-shaped and have an opening for receiving the rotor, a toothed portion which projects substantially perpendicularly from said disc-shaped part and which is arranged sectorwise around said opening, and a substantially cylindrical portion which is situated around the outer circumference. The cylindrical portion projects in the same direction as the toothed portion, and has an axial height which is equal to half the axial height of the stator sections. The disc-shaped parts are arranged in pairs to form two spaces for accommodating the annular coils, these parts being angularly shifted relative to each other in such a way that for each stator section the toothed portions of one part lie between the toothed portions of the other part, and the offsets between the sets of teeth are $\frac{1}{4}$, $\frac{1}{2}$ and $\frac{3}{4}$ tooth pitch.

Further, it is advantageous if the two rotor sections in the motor in accordance with the invention are axially laminated.

In the motor in accordance with U.S. Pat. No. 4,206,374, which comprises two toothed discs per rotor section, the flux produced upon energization of the coil extends in the axial direction from one toothed disc to the other toothed disc of the same rotor section. This flux causes eddy currents which cannot be reduced by axial lamination. In the motor in accordance with the invention the flux extends in the circumferential direction through the toothed disc over 90°. This enables the eddy currents to be reduced by axial lamination of the toothed rotor discs.

The invention will be described in more detail, by way of example, with reference to the drawing.

DESCRIPTION OF THE PREFERRED EMBODIMENTS

Figure 1:
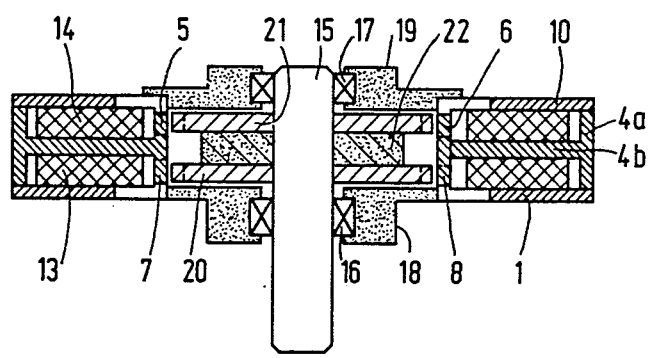
FIG. 1 is an axial sectional view of a first embodiment of the invention.
Figure 2:
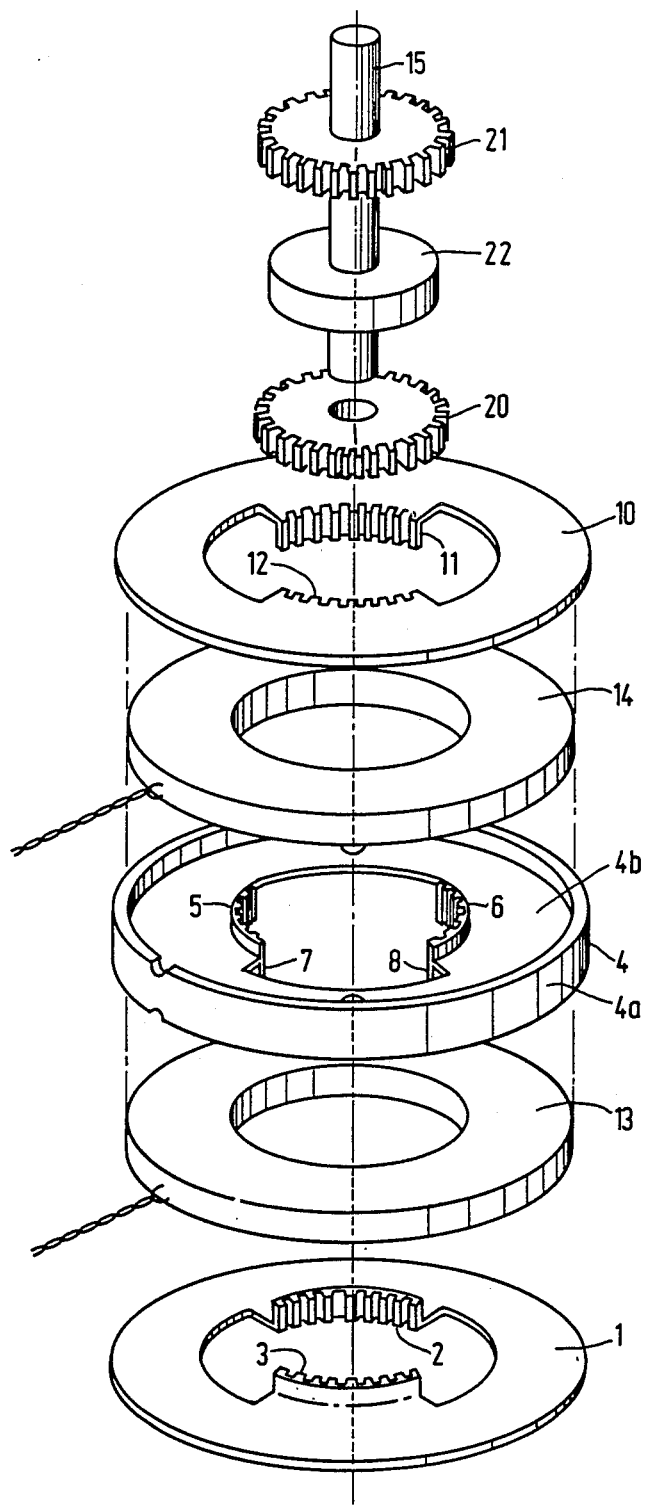
FIG. 2 is an exploded view of the motor shown in FIG. 1.

FIG. 1 is an axial sectional view of a motor embodying the invention and FIG. 2 is an exploded view of the motor (without rotor bearing means). The motor comprises a stator and a rotor. The stator comprises a substantially disc-shaped part 1 with an opening for the rotor, around which opening two facing sectors of teeth 2 and 3 forming a set, are situated on a cylindrical surface. The sectors of stator teeth each cover less than $\frac{1}{4}$ of the circumference. This part is engageable in a central part 4 which comprises a circumferential cylindrical portion 4a and, halfway its height, a disc-shaped inner portion 4b in which an opening for the rotor is formed. Four sectors of teeth 5, 6, 7 and 8 are situated on a cylindrical surface around the opening, the sectors 5 and 6 projecting axially towards one side and the sectors 7 and 8 towards the other side, in such a way that the sectors 7 and 8 are situated between the sectors 2 and 3 of the part 1. Each of the sectors 5 to 8 covers less than a quarter of the circumference. An upper part 10 fits on the center part 4, which upper part is in principle identical to the part 1 but which is turned upside down. This upper part 10 comprises a set of teeth formed by sectors 11 and 12 which are situated between the sectors 5 and 6 of the center part. Annular coils 13 and 14 are accommodated in the annular spaces formed between the parts 1 and 4 and the parts 4 and 10, respectively.

The rotor comprises a shaft 15 which is supported in bearings 16 and 17 which are mounted in the stator sections 1 and 10, respectively via parts 18 and 19, respectively made of, for example, a plastic material, for example by injection molding. The shaft 15 carries two discs 20 and 21 which each have teeth on the outer circumference, the pitch of these teeth being equal to that of the teeth of the sets of stator teeth. These discs are so arranged that the teeth of disc 20 cooperate with the teeth of sectors 2, 3, 7 and 8 and the teeth of disc 21 cooperate with the teeth of sectors 5, 6, 11 and 12. An axially magnetized permanent magnet 22 is arranged between the two rotor discs.

Figure 3:
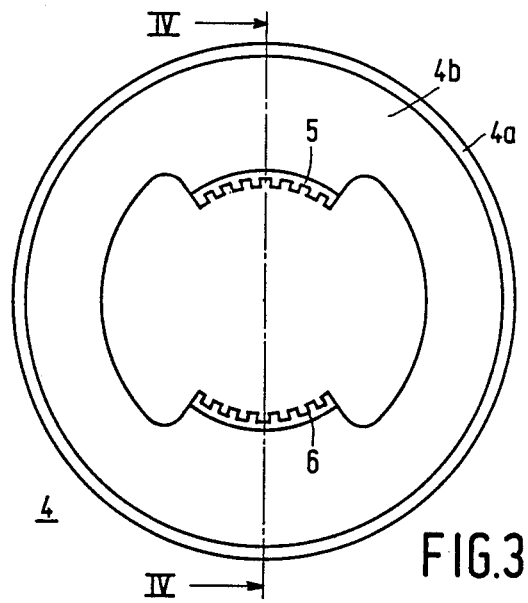
FIG. 3 is a plan view of the part 4 of the motor shown in FIGS. 1 and 2.
Figure 4:
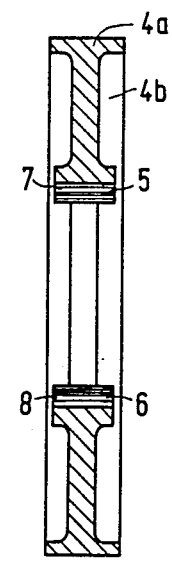
FIG. 4 is a sectional view taken on the line IV—IV in FIG. 3.
Figure 5:
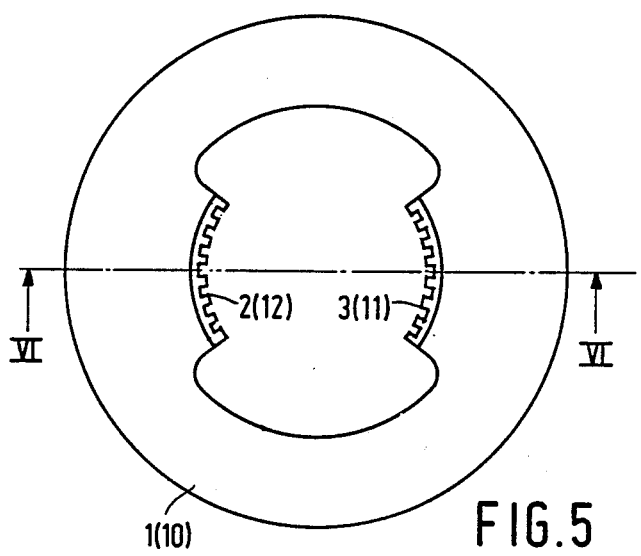
FIG. 5 is a plan view of the part 1 (10) of the motor shown in FIGS. 1 and 2.
Figure 6:
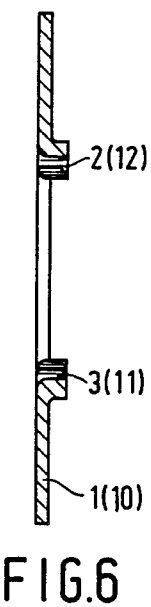
FIG. 6 is a sectional view taken on the line VI—VI in FIG. 5.
Figure 7:
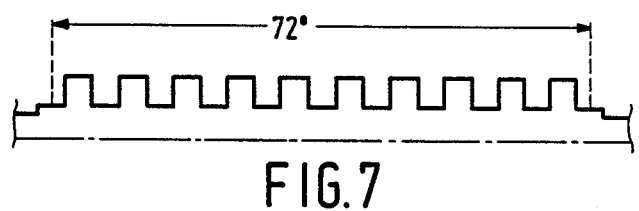
FIG. 7 shows schematically the arrangement of the stator teeth on the parts shown in FIGS. 4 and 6.
Figure 8:
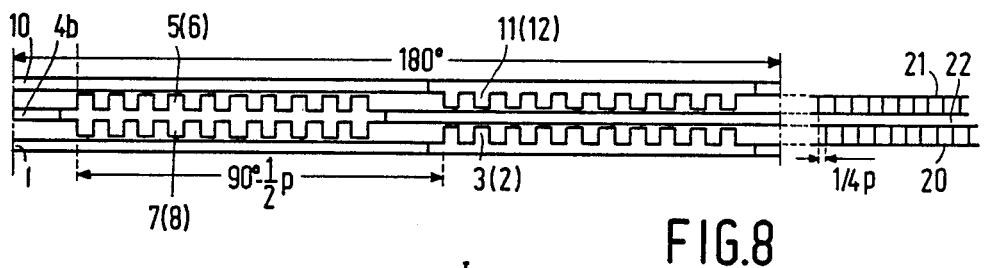
FIG. 8 shows schematically the arrangement of the stator and rotor teeth relative to each other.

FIG. 3 is a plan view of the stator section 4, FIG. 4 a sectional view taken on the line IV—IV, FIG. 5 is a plan view of the stator section 1 or an underneath view of the stator section 10, FIG. 6 is a sectional view taken on the line VI—VI, and FIG. 7 shows schematically the arrangement of the teeth in the sectors of teeth 2, 3, 5, 6, 7, 8, 11 and 12. Each of these sectors covers less than $\pi/2$ radians, or 90°, so that the sectors alternate, or fit between one another. Thus there is a clearance of more than one tooth pitch between adjoining sectors. In the present example the sectors each comprise 10 teeth with a tooth pitch of 7.2°. For such a stator tooth spacing, the rotor will then also have a tooth pitch of 7.2°, so that the number n of rotor teeth is 50. Moreover, it is clear that, to provide clearance between the sectors, if there are m sectors of k teeth each per set (that is, 2 mk stator teeth for each stator section), k must be less than n/2 m. In this embodiment, where n=50 and m=2, k must be less than $12\frac{1}{2}$ and has a preferred value of 10, which is two full teeth less than the theoretical maximum. Between the sectors of teeth the inner rim of the disc-shaped part of each stator section recedes in an outward direction to provide enough space for the sectors of teeth of the adjacent part.

FIG. 7 illustrates the arrangement of the various teeth relative to each other by showing one half of a developed interior view of the stator and a part of a developed exterior view of the rotor. The tooth arrangement is such that an offset of half a tooth pitch p is obtained between the sectors 2, 3 and 7, 8 and between the sectors 5, 6 and 11, 12 (apart from a rotation through an integral multiple of the tooth pitch p, in particular 90°), the sectors 5, 6 are situated in line with the sectors 7, 8 and the systems 11, 12 are situated in line with the sectors 3, 2. The teeth of the rotor discs have an offset of $\frac{1}{4}$ tooth pitch. Many variants to this tooth arrangement are possible, such as:

the sectors 7, 8 are offset relative to the sectors 5, 6 to the same extent (apart from offsets through an integral multiple of tooth pitches) as that between the sectors 11, 12 and 3, 2. Examples of this are offsets through $\frac{1}{2}$ tooth pitch, through 90° and through $90° \pm \frac{1}{2}$ tooth pitch.

The rotor teeth are situated in line and offsets of $\frac{1}{4}$ tooth pitch are provided between the sectors 5, 6 and 7, 8 and between the sectors 3, 2 and 11, 12 as the case may be, in combination with the first-mentioned variants.

Different numbers of sectors per circumference, for example a division into m sectors. If m=4, each sector is less than $\pi/4$ radians or 45°; i.e. four sectors of teeth per set, or eight sectors of teeth per circumference.

In principle, all variants are possible which provide a shift of 180° electrical between the sets of teeth associated with the same annular coil and a phase shift of 90° electrical between the sets of teeth associated with one annular coil and those associated with the other annular coil relative to the teeth of the associated rotor disc.

Figure 9:
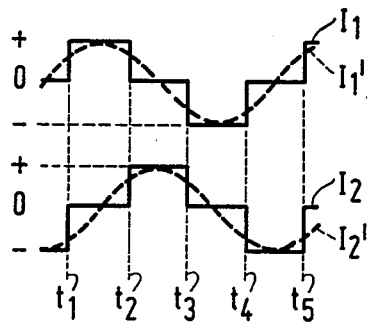
FIG. 9 shows the energizing currents for the motor in accordance with the invention as a function of time.

FIG. 9 shows schematically suitable energizing currents $I_1$ and $I_2$ for the annular coils 13 and 14, respectively. A current is said to be positive if the field in the air gaps between the teeth of sectors 2, 3 and the teeth of the rotor disc 20 and the field in the air gaps between the teeth of the sectors 11, 12 and the teeth of the rotor disc 21 add to the field produced by the permanent magnet 22. If the current $I_1$ is positive ($I_2=0$) between the instants $t_1$ and $t_2$, the field generated by this current adds to the permanent-magnet field in the air gaps between the teeth of the sectors 2, 3 and of the rotor disc 20, so that the teeth of the rotor disc 20 will be oriented towards the teeth of the sectors 2, 1. If subsequently the current $I_2$ becomes positive ($I_1=0$), the same will happen between the teeth of the rotor disc 21 and the sectors of teeth 11, 12, so that the rotor is rotated through an angle equal to $\frac{1}{4}$ tooth pitch. Now the current $I_1$ becomes negative which causes the teeth of the rotor disc 20 to be oriented towards the teeth of the sectors 7, 8, which again results in a rotation through $\frac{1}{4}$ tooth pitch. After this, the current $I_2$ becomes negative ($I_1=0$), so that the teeth of the rotor disc 21 are oriented towards the teeth of the sectors 5, 6, upon which one full cycle with a rotation through one tooth pitch p is completed. This means that the stepping angle is $\frac{1}{4}$ tooth pitch or 1.8° ($0.01\pi$ radians) in the present example.

If the motor is energized with the sinusoidal currents $I_1'$ and $I_2'$ which are represented by broken lines and which have a phase shift of 90°, the motor will behave as a synchronous motor.

Figure 10:
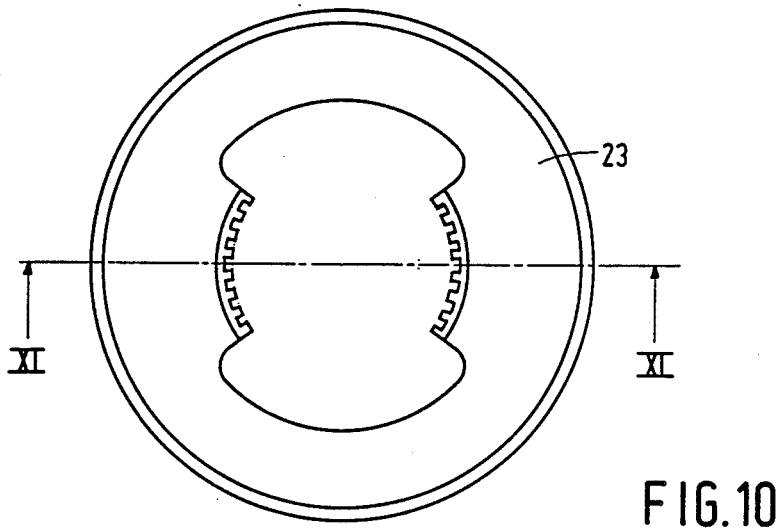
FIG. 10 is a plan view of a part 23 for a second embodiment of the invention.
Figure 11:
FIG. 11 is a sectional view taken on the XI—XI in FIG. 10.
Figure 12:
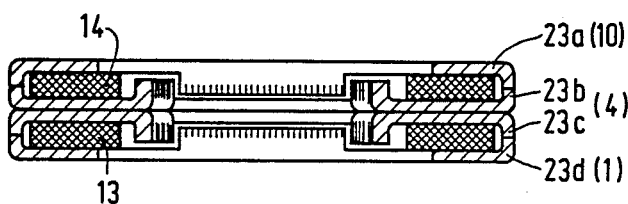
FIG. 12 is an axial section view of this second embodiment.

In the embodiment shown in FIGS. 1 and 2 two different stator sections are required, namely the part 4 and the identical part 1 and 10. However, if stator sections 23 as shown in FIG. 10 (plan view) and FIG. 11 (sectional view on the line XI—XI) are employed, the stator may be constructed with similar parts 23 (apart from the coils and bearings), as is shown in the sectional view in FIG. 12. In FIG. 12 the center part 4 in FIG. 1 is constituted by securing two identical parts 23b and 23c back to back to one another as shown in FIGS. 10 and 11. The identical parts 23a and 23d function as the upper and lower parts (1, 10) by rotating them through the appropriate angle (90°−½/p) relative to the center part.

A modification to the motor shown in FIG. 12 is obtained by making the projecting outer rim of the outer parts 23a and 23d higher and by using parts without projecting outer rims (such as the parts 1 and 10 in FIGS. 1 and 2) for the inner parts.

Figure 13:
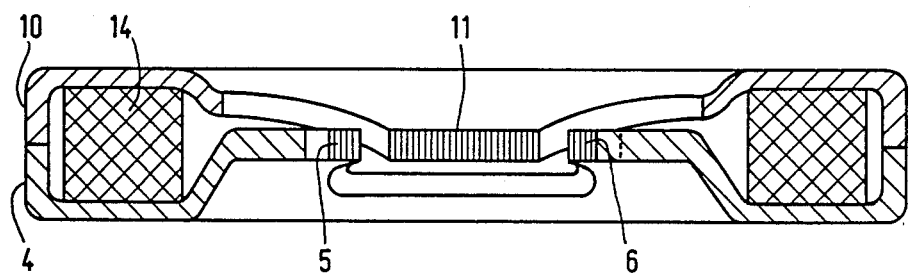
FIG. 13 is a sectional view of one stator section of a third embodiment of the invention having a reduced axial height of the stator teeth.
Figure 14:
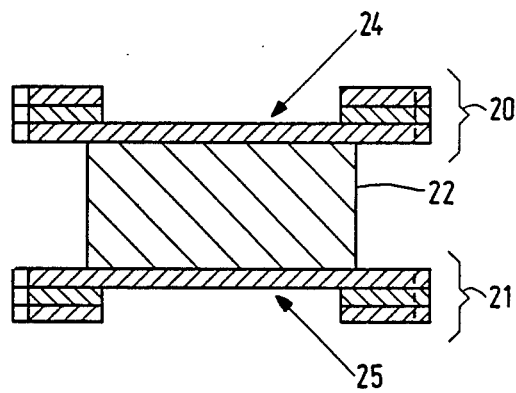
FIG. 14 is an axial section, at an enlarged scale, of a rotor used in the embodiment of FIG. 13 and having a short magnet.
Figure 15:
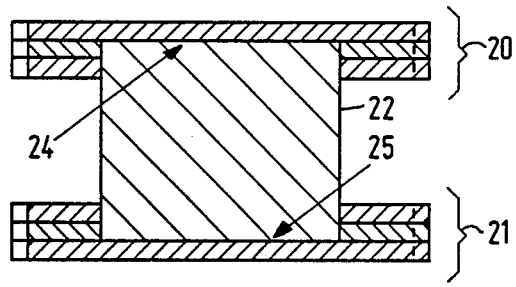
FIG. 15 is an axial section of a fourth embodiment rotor having a relatively longer magnet, and usable with the stator sections of FIG. 13.

FIG. 13 is a sectional view of one stator section of a modification in which the teeth are not arranged on a flanged portion but extend substantially radially inwards. The axial height of the stator teeth is then reduced. In order to ensure that the effective axial height of the teeth of the sets of stator teeth (that is, the overlapping portions of the stator sections and the cooperating rotor sections remains the same) which in the motors shown in FIGS. 1 and 10 is achieved by giving the stator teeth an axial height larger than the axial height of the rotor teeth, the rotor teeth in this variant are made larger, for example by the use of cup-shaped toothed rotor discs as shown in FIG. 14 or 15. In the motor shown in FIG. 14 the rotor discs 20 and 21 are cup-shaped with the "cups" 24, 25 facing outwards, which is possible by the use of a short magnet 22 of, for example, samarium-cobalt. Parts of the rotor-bearing means can then be accommodated in the "cups" 24, 25, which results in a reduced axial length. Other magnet materials such as ticonal require a larger axial length, which becomes possible when the rotor shown in FIG. 15 is used, where the "cups" 24, 25 in the rotor discs 20 and 21 accommodate the magnet 22.

In view of the small axial height of the motor it is advantageous for some uses to arrange a plurality of motors in accordance with the invention, for example two, on one shaft, axially aligned, in order to increase the torque or to reduce the stepping angle, the latter case requiring an offset through ½ tooth pitch between the two motors.

In the known motor in accordance with the aforementioned U.S. Pat. No. 4,206,374, which motor comprises two toothed discs per rotor section, the flux produced by energization of the coil extends in the axial direction from one toothed disc to the other. This causes eddy currents which cannot be reduced by axial lamination. In the motor in accordance with the present invention the flux extends in the circumferential direction through the toothed disc over 90°. Then the eddy currents can be reduced by axial lamination of the toothed rotor discs.

Such a lamination simply allows a cup-shaped structure of the toothed rotor discs (see for example the lamination of the toothed discs 20 and 21 in FIGS. 14 and 15).

What is claimed is:

1. A synchronous motor comprising a stator and a rotor, which rotor comprises two coaxial rotor sections which are each provided with rotor teeth at the outer circumference, which teeth are arranged along a circle and which are axially spaced by an interposed axially magnetized permanent magnet, the stator comprising two coaxial stator sections which are interconnected in a magnetically conductive fashion and which are each provided with at least one coaxial annular coil which is enclosed by a magnetically conductive circuit which comprises a rotor section and the stator section which surrounds the relevant annular coil, each stator section terminating in two sets of coaxially arranged stator teeth which cooperate with the rotor teeth via air gaps, one of said sets of stator teeth being oriented towards the cooperating rotor teeth and the other sets of stator teeth being offset from the cooperating rotor teeth by substantially ¼, ½ and ¾ tooth pitch in such a way that a difference in offset of ½ tooth pitch is obtained between the stator sections, characterized in that for each rotor section there is provided only one set of circularly arranged teeth and for each set of stator teeth the teeth are arranged in at least two sectors which alternately comprise teeth and do not comprise teeth, which sectors for each stator section are so positioned relative to each other that the sectors of teeth of one set are interposed between the sectors of teeth of the other set of said stator section, the teeth being so arranged that for each stator section the teeth of both sets cooperate with the same set of teeth of the associated rotor section.

2. A synchronous motor as claimed in claim 1, characterized in that the stator comprises four substantially identical parts of a magnetically conductive material, which parts are substantially disc-shaped and have an operating for receiving the rotor, a toothed portion which projects substantially perpendicularly from said disc-shaped part and which is arranged sectorwise around said opening, and a substantially cylindrical portion which is situated around the outer circumference, which projects in the same direction as the toothed portion, and which has an axial height which is equal to half the axial height of the stator sections, which disc-shaped parts are arranged in pairs to form two spaces for accommodating the annular coils, said parts being radially shifted relative to each other in such a way that for each stator section the toothed portions of one part lie between the toothed portions of the other part and the said offsets between the sets of teeth are ¼, ½ and ¾ tooth pitch.

3. A synchronous motor as claimed in claim 1, characterized in that the two rotor sections are axially laminated.

4. A synchronous motor as claimed in claim 2, characterized in that the two rotor sections are axially laminated.

5. A motor comprising a stator and a rotor each having first and second sections, a respective rotor and stator section cooperating magnetically,
  each rotor section having a circular outer circumference having n equally spaced rotor teeth where n is an integer, and said rotor further comprising an axially magnetized permanent magnet disposed between said rotor sections,
  each of said stator sections comprising at least one annular coil generally coaxial with said rotor and a magnetically conductive circuit partially enclosing said coil and terminating in first and second sets of coaxially arranged stator teeth arranged to cooperate with respective rotor teeth of a respective rotor section via radial air gaps, the teeth of each set being arranged with a tooth-to-tooth pitch of $2\pi/n$ radians, and the teeth of the second set being angularly displaced with respect to the teeth of the first set of the respective section by $\pi/n$ radians, the relative orientation of the rotor and stator teeth of one cooperating rotor and stator section being angularly displaced with respect to the rotor-stator tooth alignment of the other cooperating rotor and stator section by $\pi/2n$ radians, characterized in that each rotor section has one set only of circularly arranged teeth, the teeth of each set of each stator section being arranged in m sectors, where m is an integer and n is at least equal to m, each sector being less than $\pi/m$ radians angular width, the sectors for the first and second sets of a given stator section being alternately arranged about the respective one only rotor section.

6. A motor as claimed in claim 5, characterized in that each rotor section comprises a plurality of flat laminations.

7. A motor as claimed in claim 5, characterized in that $m=2$, and each sector has k teeth, where k is an integer and $k<(n/2m)$.

8. A motor as claimed in claim 7, characterized in that each rotor section comprises a plurality of flat laminations.

* * * * *